Oct. 8, 1935.  H. WENER  2,016,733

LOCK HOOK

Filed Feb. 14, 1935

Inventor

*Harold Wener*

By *Clarence A. O'Brien*
Attorney

Patented Oct. 8, 1935

2,016,733

UNITED STATES PATENT OFFICE 2,016,733

LOCK HOOK

Harold Wener, Herkimer, N. Y.

Application February 14, 1935, Serial No. 6,557

3 Claims. (Cl. 24—226)

This invention relates to what may be termed a lock hook, and more particularly to a fastener of the hook and eye type.

An object of the invention is to provide such a fastener, so constructed, that when the parts of the fastener are engaged, and as when used on a garment or the like, no bulky or unsightly effect will result, as is now the objection to many types of fasteners now generally employed.

The invention together with its objects and advantages will be best understood from a study of the following description, taken in connection with the accompanying drawing wherein.

Figure 1:
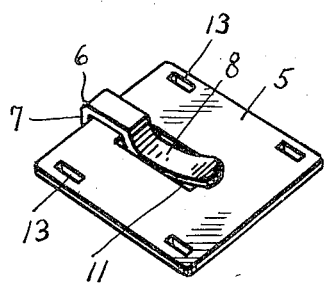
Figure 1 is a perspective view of the hook plate.
Figure 2:
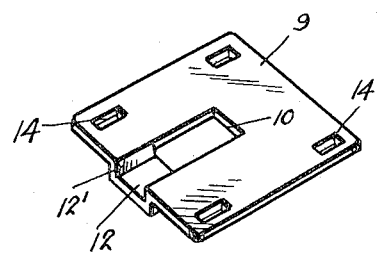
Figure 2 is a perspective view of the eye plate.

Referring to the drawing by reference numerals it will be seen that the device comprises an eye plate 5 which is preferably square and which may be of any suitable dimension. Formed integral with one edge of the plate 5 is a hook including a flat shank portion 6 extending in spaced parallelism to the plate 5, a web portion 7 connecting the shank 6 with one edge of the plate 5, and a longitudinally curved bill portion 8, the concave face of which is presented upwardly or outwardly.

The device also includes what may be termed an eye plate 9, the same being substantially the same dimension as the plate 5 and provided with a slot 10 adapted to align with a slot 11 provided in the plate 5 for accommodating the bill 8 of the hook. The slot 10 of the eye plate 9 opens through one edge of the plate, and adjacent said edge the plate 9 is provided on one side thereof with a transverse ridge or loop 12 that has a part offset from the plane of the plate 9 and extending across the notch 10, and connected with the opposite edges of the notch 10 by web portions 12' that extend substantially at right angles to the plate 9.

Figure 3:
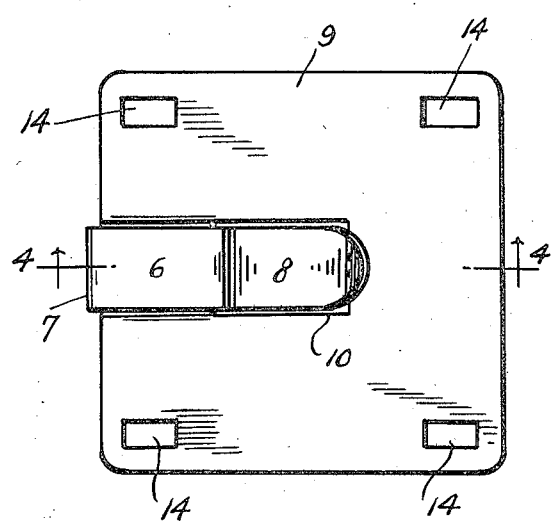
Figure 3 is plan view with the hook and eye plates assembled.
Figure 4:
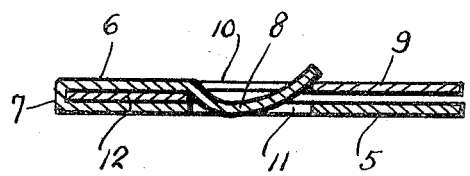
Figure 4 is a detail view taken substantially on the line 4—4 of Figure 3.

In actual practice, to engage the members 5 and 9, the eye plate 9 is slid over and relative to the plate 5 to align the notch 10 with the notch 11. When the notches 10 and 11 align the bill 8 of the hook springs into engagement with the aligned notches with the loop 12 accommodating and substantially straddling the shank 6 of the hook as will be clear from a study of Figures 3 and 4. Thus the plates are releasably engaged and can be separated in a quick and convenient manner.

Each of the plates 5 and 9 is provided adjacent the corners thereof with openings whereby the plates may be secured to the garment, the openings in the plate 5 being indicated by the reference numeral 13, and the openings in the plate 9 being indicated by the reference numeral 14.

It is thought that a complete understanding of the invention, together with its utility and advantages will be had from the foregoing.

One of the real important advantages of the lock hook is the fact that it can readily be sewed on a garment by a machine.

Having thus described the invention what is claimed as new is:

1. In a fastener of the character described comprising a pair of plates adapted to be engaged in substantial overlapping sliding engagement, one of said plates having a web extending at right angles thereto from one edge thereof, a hook having a shank integral with said web and a longitudinally curved integral bill portion, the other of said plates formed with an outset loop along one edge to receive the shank, and means formed on said other plate inwardly of the loop co-acting with the curved bill portion for releasably retaining the plates in overlapping relation.

2. In a fastener of the character described comprising a pair of plates adapted to be engaged in substantial overlapping sliding engagement, one of said plates having a web extending at right angles thereto from one edge thereof, a hook having a shank integral with said web and a longitudinally curved integral bill portion, the other of said plates formed with an outset loop along one edge to receive the shank, means formed on said other plate inwardly of the loop connecting with the curved bill portion for releasably retaining the plates in overlapping relation, and each of said plates being provided with openings for the reception of stitching whereby the plates may be secured to garments.

3. A fastener of the character described comprising a hook plate, a hook including an outset web integral with one edge of the plate and a shank portion in spaced parallelism to the plate and an integral longitudinally curved bill portion, said plate being also provided with a slot through which a portion of the bill portion extends, and an eye plate adapted to be slid into position between said hook plate and said hook, said eye plate being provided with a slot to align with the slot in the hook plate, and the bill of said hook adapted to engage the aligned slots upon insertion of the eye plate between said hook plate and said hook.

HAROLD WENER.